Oct. 10, 1961  R. ORSINI  3,003,681
CONTAINERS CONSTRUCTED OF DEFORMABLE MATERIAL
Filed Sept. 8, 1958
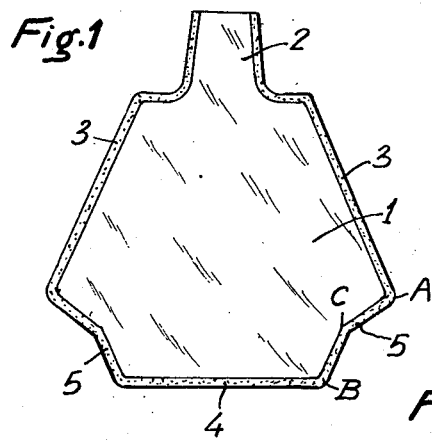
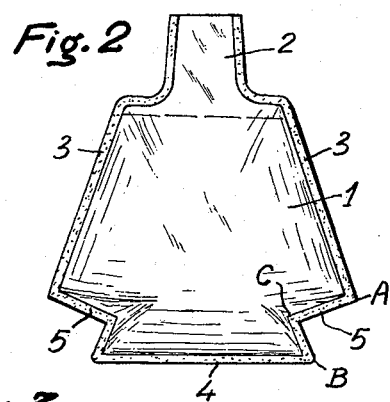
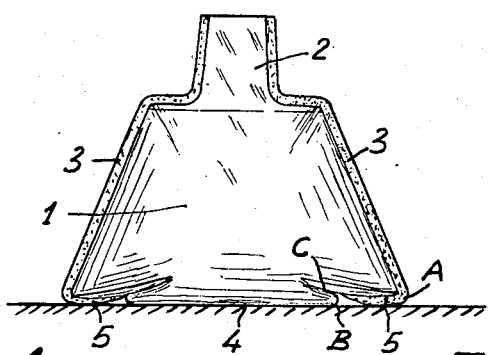
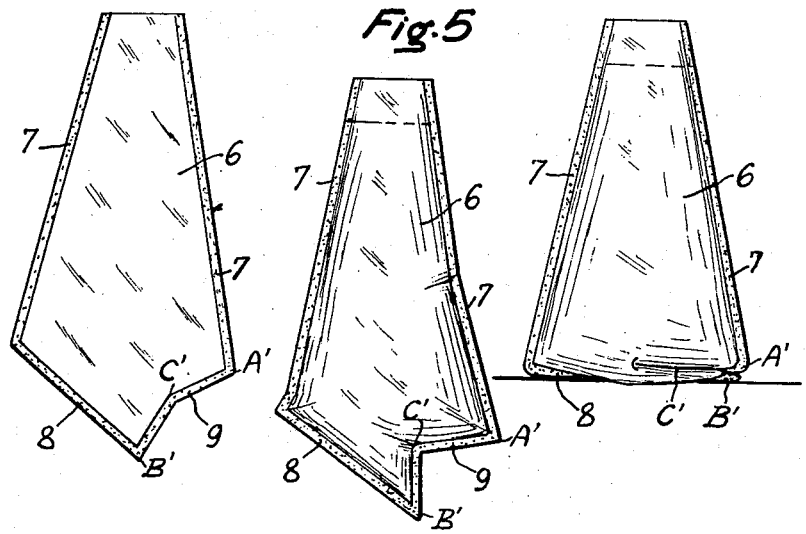

Oct. 10, 1961   R. ORSINI   3,003,681
CONTAINERS CONSTRUCTED OF DEFORMABLE MATERIAL
Filed Sept. 8, 1958   8 Sheets-Sheet 2
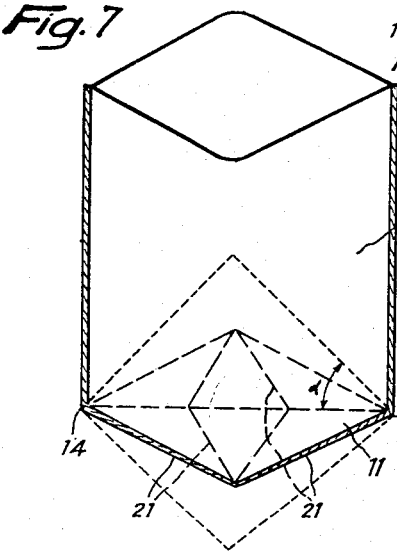
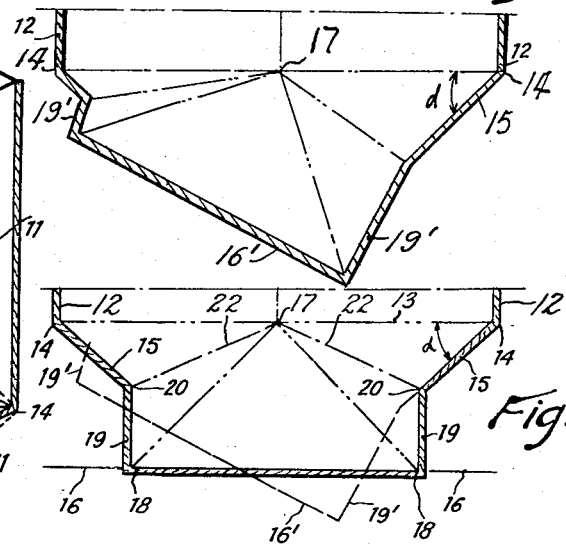
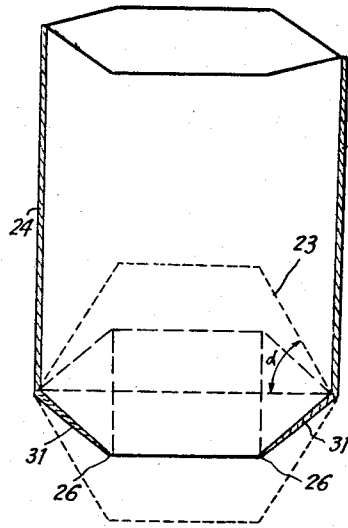
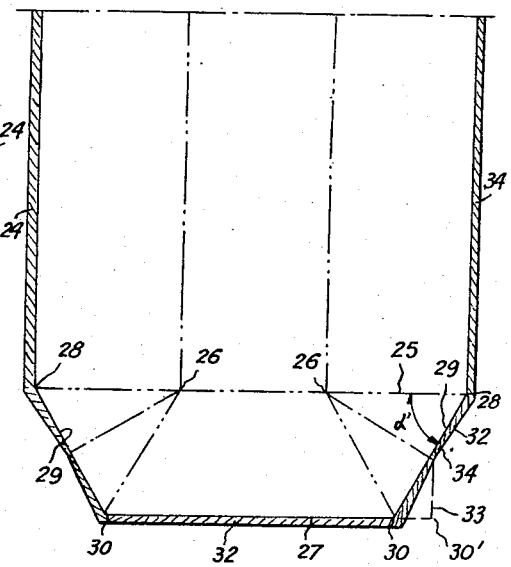

Oct. 10, 1961               R. ORSINI               3,003,681
CONTAINERS CONSTRUCTED OF DEFORMABLE MATERIAL
Filed Sept. 8, 1958                            8 Sheets-Sheet 4
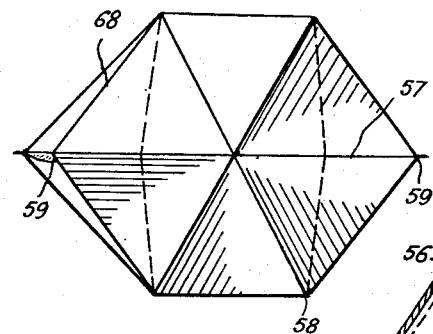
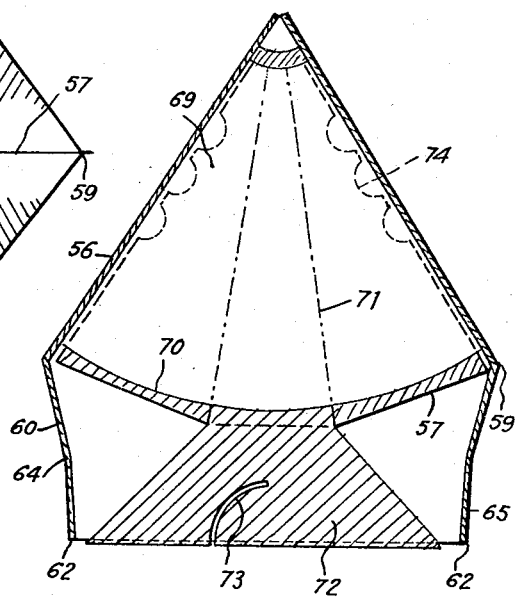
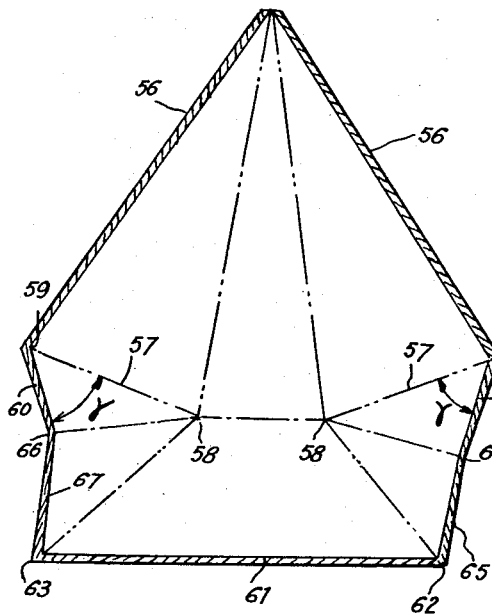
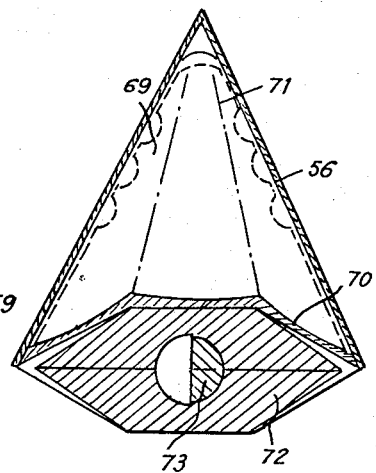

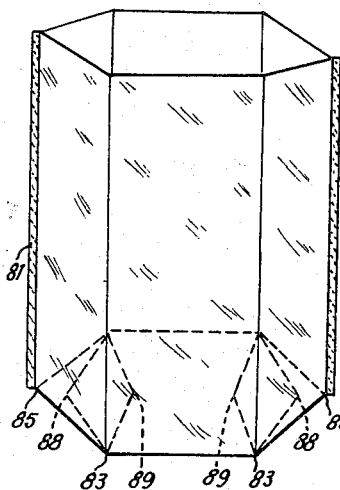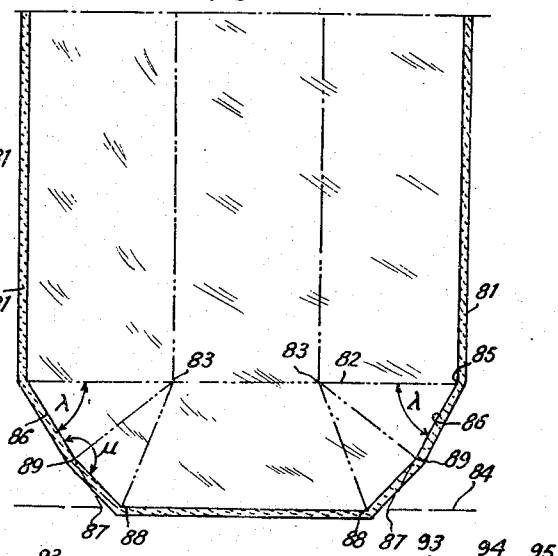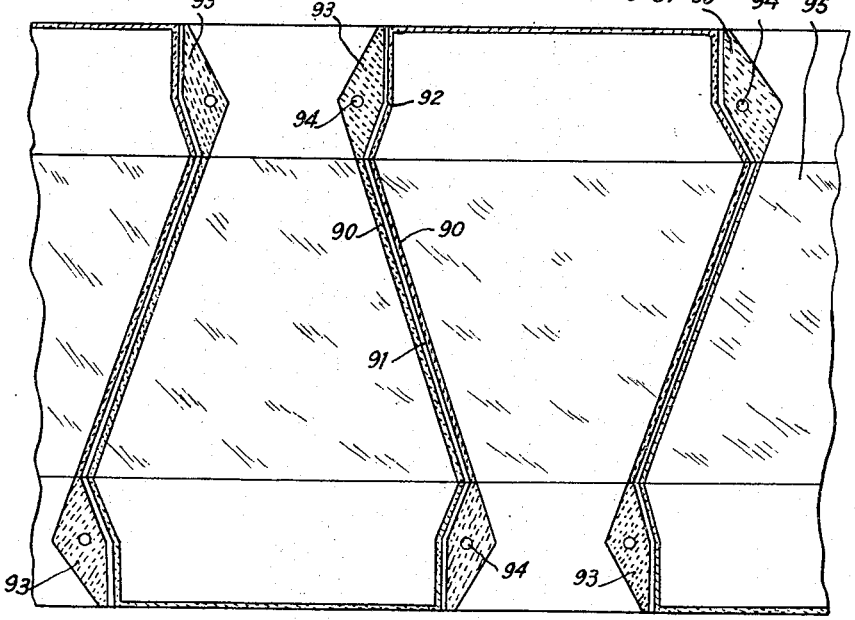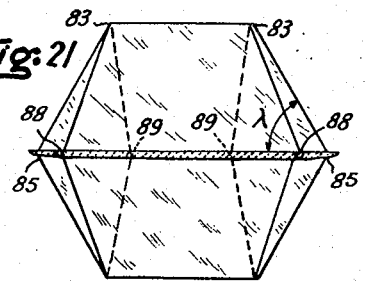

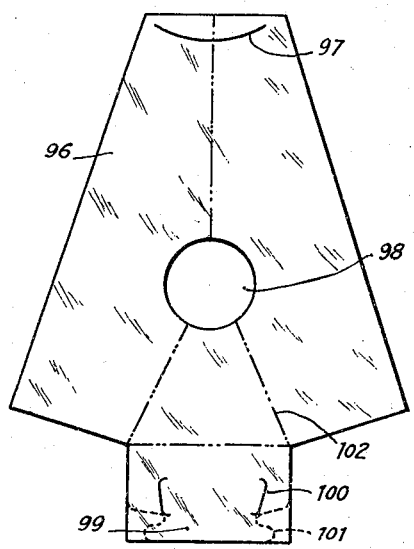
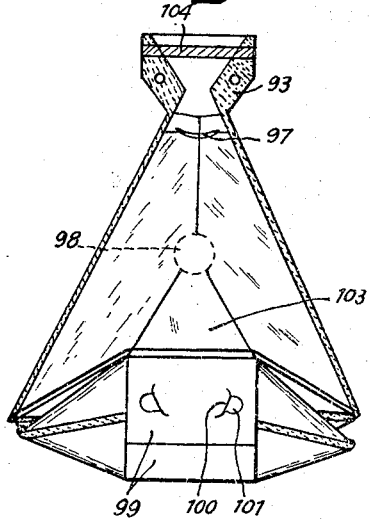
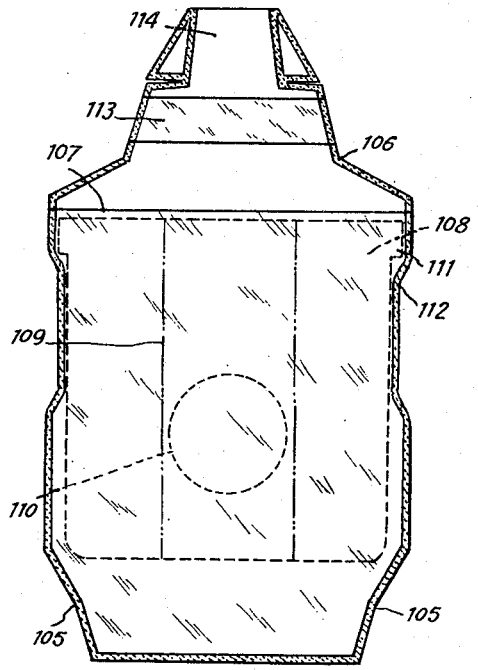
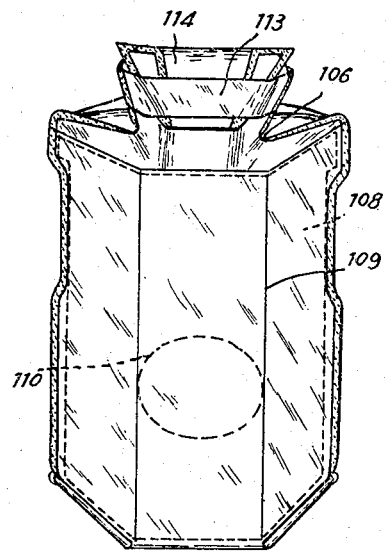

United States Patent Office

3,003,681
Patented Oct. 10, 1961

3,003,681
CONTAINERS CONSTRUCTED OF DEFORMABLE MATERIAL
René Orsini, 32 Rue du 31 Decembre, Geneve, France
Filed Sept. 8, 1958, Ser. No. 759,752
Claims priority, application France Sept. 10, 1957
9 Claims. (Cl. 229—57)

My invention is in respect of flat containers or sachets, that is to say, containers or sachets produced from two superposed foils or from a sheathing, by gluing or welding the two thicknesses along a marking line. These sachets are notably those made of flexible foil, especially thermoplastic film, or paper, cloth or similar material, but the invention applies just as well to sachets made of more rigid material complete with folding scarves. Consequently, the term welding line will hereinafter refer either to the welding or gluing line between two superposed films or foils, or to a folding line when it is a question of a sheath or of a film folded into the shape of a V.

Upon being filled, flat-lying sachets of this type become deformed, giving a cushion-like shape, the two facing limited by the welds bulging outwards. Because of this, they do not present anywhere a flat surface capable of constituting a firm base. Such a flat surface constituting a firm base is however of particular interest for enabling the sachet to be stood upright after it has been opened or part-emptied.

An object of my invention is a flat container or sachet which becomes deformed volumetrically giving at least one flat facing.

Another object of my invention is a method for the production of a flat sachet which becomes deformed volumetrically giving at least one flat facing with an axis of symmetry.

A further object of my invention is a method for the production of a flat sachet which becomes deformed volumetrically giving at least one flat facing with an axis of symmetry, said method comprising the steps of tracing flatwise the development of the faces of the volume to obtain by folding the flat facing along its axis of symmetry and superposing the lateral facings terminating on the edges of the flat facing by folding along the edges of the volumetrically deformed sachet terminating at the apexes of the flat facing's axis of symmetry, selecting two panels of a foldable material, joining said panels along two first lines corresponding to the edges of the volumetrically deformed sachet terminating at the apexes of the flat facing's axis of symmetry, joining said panels along a third line corresponding to the folding of the flat facing, selecting two points on the said third joining line and joining each of said points to the nearest lower extremity of the two first joining lines by two joining lines, the two broken parts of said joining lines forming between them an obtuse angle.

The outline thus obtained between the third joining line and the two first joining lines may be either concave or convex. In the case of a concave outline there is formed automatically, under the action of internal pressure during filling for example, a box fold which, under the simple hydrostatic pressure of the liquid, opens out flat, giving the swelling desired.

In the case of a convex outline, it is necessary, before, during and after filling, to take in the protuberances corresponding to the apexes of the obtuse angles, but the box fold so formed is stable.

It is possible to fix upon a peripheral outline such that the sachet is deformed volumetrically, giving a fairly predetermined shape, notably any volumetric shape, prismatic or pyramidal with four or six sided base constituted by a regular or irregular geometrical figure but having an axis of symmetry passing through two apexes.

A still further object of my invention is a flat sachet which becomes deformed volumetrically giving at least one flat facing with an axis of symmetry, said flat sachet comprising two panels of a foldable material joined along two first lines corresponding to the edges of the volumetrically deformed sachet terminating at the apexes of the flat facing axis of symmetry, flatwise developed by superposing the lateral facing by folding along said edges also joined along a third line corresponding to a folding of the flat facing along its axis of symmetry, two points on the said third joining line being joined to the nearest lower extremity of the two first joining lines by two broken joining lines, the two broken parts of said joining lines forming between them an obtuse angle.

Finally, according to a perfected form of application, the sachet, made of flexible material, is sheathed in a semi-rigid surface. This surface may have folding scarves and may extend over the whole of the sachet's outer surface with the exception as a matter of preference, of the parts which undergo deformation in order to give rise to the concertina-like swelling. It is however possible—and it does in fact fall within the scope of my invention—to give the semi-rigid surface when flat, folding scarves which will bring about the deformation according to the shape which the sachet is intended to assume, and, in this case, the concertina-like swellings can equally well be constituted by, or sheathed in a semi-rigid substance.

Other characteristics of my invention will emerge from the description which now follows relating to numerous examples of execution, in which reference will be made to the accompanying drawings, in which:

FIG. 1 is an elevation view of a flat sachet which becomes deformed volumetrically in order to give a fairly hexagonal flat base;

FIG. 2 is an elevation view of the sachet as per FIGURE 1, in a filled condition;

FIG. 3 is an elevation view of the sachet as per FIGURE 1, standing upright;

FIG. 4 is an elevation view of a flat sachet which deforms volumetrically to assume the shape of a pyramid with a flat base of diamond shape;

FIG. 5 is an elevation view of the sachet as per FIGURE 4, in a filled condition;

FIG. 6 is an elevation view of the sachet as per FIGURE 4, standing upright;

FIG. 7 is a perspective view of a sachet of prismatic shape with square base;

FIG. 8 is a plan view of the bottom portion of the sachet as per FIGURE 7, laid out flat, showing details of how it is traced out;

FIG. 8a is a modification of FIGURE 8;

FIG. 9 is a view corresponding to that of FIGURE 7 for a prismatic sachet with a base of regular hexagonal shape;

FIG. 10 is a view corresponding to that of FIGURE 8 for the sachet illustrated in FIGURE 9;

FIG. 15 is a plan view of a pyramidal sachet with a base of irregular hexagonal shape, and, on the left, projecting concertina lugs;

FIG. 16 is a flat outline view of the sachet as per FIGURE 15;

FIG. 17 is a flat view of a sachet on an irregular hexagonal base similar to that shown in FIGURE 16, with its carton sheathing;

FIG. 18 is a perspective view of the sachet as per FIGURE 17, in a filled condition;

FIG. 19 is a perspective view of a prismatic sachet with a base of regular hexagonal shape similar to that shown in FIGURE 9, but produced from a convex outline;

FIG. 20 is a view of the bottom part of the sachet as per FIGURE 19, laid out flat, and showing details of of how it is traced out;

FIG. 21 is a view from underneath the base of the sachet as per FIGURE 19;

FIG. 22 is a plan view of the marking out and welding on two superposed foils for producing flat sachets which become deformed when filled, resulting in pyramidal sachets on a hexagonal base;

FIG. 23 is a plan view of the semi-rigid strengthening pieces for the sachets produced in accordance with FIGURE 22;

FIG. 24 is a perspective view of the sachet corresponding to FIGURES 22 and 23 after assembly and filling;

FIG. 25 is a view, on the flat, of another type of sachet forming a hexagonal bottle, and FIG. 26 is a perspective view of the sachet as per FIGURE 25 after filling;

Figure 31:
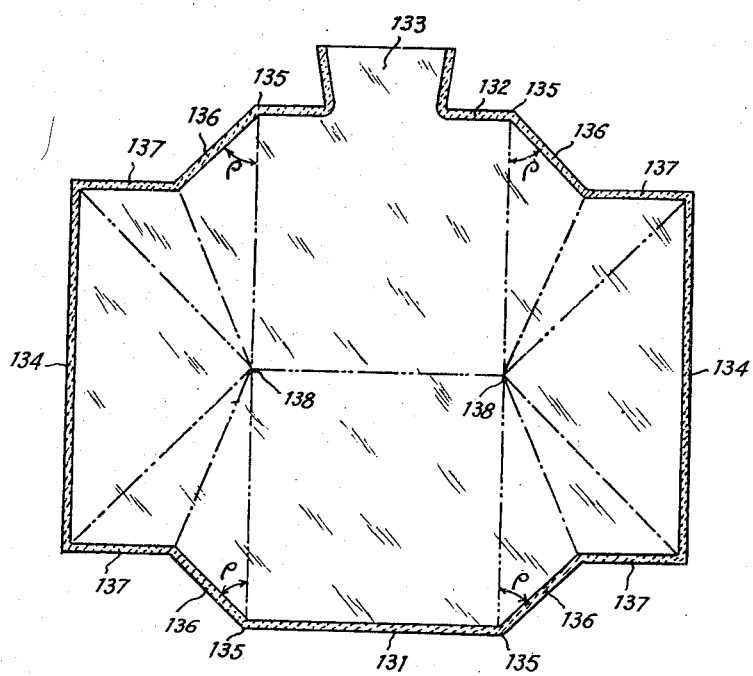
FIG. 31 is a view of a sachet laid out flat giving a sachet of cubic shape.
Figure 32:
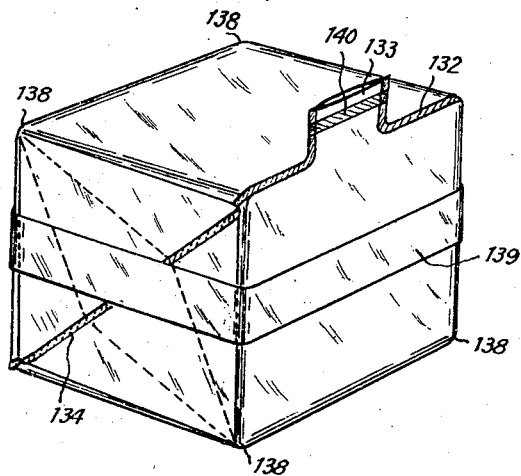

FIG. 32 is a perspective view of the sachet as per FIGURE 31, in a filled condition The sachet or container 1 of FIGURES 1 to 3 has, laid out flat, an upper portion of any shape, which might be rectangular or otherwise, but which has been shown as being trapezoidal and with a neck 2. This sachet is produced for example, by two sheets or panels of polyethylene or similar deformable substance, joined at their lateral edges by welds 3.

Conforming to my invention, the base of the sachet is constituted by a weld 4 perpendicular to the axis which is joined to the welds of the side edges 3 by two margins sealed or tightly joined at 5 recessed to form at apex C.

In other words, the above panels in FIGS. 1 to 3 have a transverse bottom edge 4 the length of which is less than the width of the panels between the lower ends of the lateral or side edges 3. The margins 5 extend from the lower ends of the lateral edges 3 to the ends of the bottom edge 4.

Upon being filled, the sachet assumes (FIG. 2) a swollen shape which is expressed by a spacing apart of the facings perpendicularly to the front plane, with a coming closer together of the opposite side welds. The result of this is that the walls in the receding angle tend to space themselves further apart, taking point C, or the apex of the angle of the cut-out panels 5, towards the inside.

If (FIG. 3) the sachet is placed on a surface, the base tends to collapse though extending the initial deformation. The box fold which starts at point C opens out in width until it flattens out completely the surface located between these points and the edge 4. This surface forms a base which ensures the stability of the sachet.

In the example of execution as shown in FIGURE 4, the sachet 6 is made up of two films or the like, of trapezoidal shape with a relatively considerable height, welded at 7 on their side edges. The base is formed by a broken-line weld with a long side 8 and a joint 9 forming an obtuse angle with the apex at C. Upon being filled, with the sachet being held at its apex, the sachet distends as shown in FIGURE 5, the angle C' receding towards the inside of the profile, forming a box fold perpendicular to the front plane. Upon the sachet's being put down (FIG. 6), the point B' is turned over towards A' and the bottom collapses to produce a base of diamond shape, the sachet assuming a pyramidal appearance.

The above methods of execution produce sachets which, upon being deformed volumetrically, present a good base but their outline is something of a rule-of-thumb matter. It is however possible to give the filled sachets a base of fairly well defined shape. The technical side of the matter in which they are produced will be gone into at a later stage.

The method of execution as shown in FIGURES 7 and 8 is aimed at the production of a flat sachet which changes in shape after filling and upon being stood upright on a surface, into a prismatic sachet with a square base. This base is shown in dotted lines as being bent back on the plane of FIGURE 7. To produce this sachet, there are applied one on top of the other, two sheets of thermoweldable material, for example, and the job of welding them together is carried out along two parallel lines 12 spaced out at an equal distance from the semi-perimeter of the square. These welds terminate on a perpendicular transverse 13 which constitutes the base line.

Starting from the points 14 there are now traced two lines 15 marking with base line 13 an angle α equal to 45°, that is to say, equal to the half-angle at the apex of the square. Next, a straight line 16 is drawn parallel to the base line and at a distance from the intermediate apex 17 equal to half the diagonal of the square. Then: two points 18 are plotted, their distance apart being equal to this diagonal, and perpendiculars 19 are raised which again cut the straight lines 15 to 20, the bisector of the obtuse angles thus formed passing through point 17. The outline thus plotted is edged by a weld.

Upon filling taking place, both folds are formed at point 20 and they give rise to two lugs 21, with edges of the box fold along bisectors 22 which, when the sachet is placed standing upright, fold back exactly underneath the base, creating two concertina folds which are limited towards the inside by the dotted lines 21.

The outline of the base may be modified, the straight line 16 being capable of occupying any position outside points 14 which conforms to the distance to point 17. Thus as shown in FIG. 8a, it may be given the position 16', the points of juncture with the straight lines 15 taking place by way of the perpendicular 19'.

The method of execution as shown in FIGURES 9 and 10 is aimed at creating a flat sachet which becomes deformed into the shape of a prism with a regular hexagonal base shown folded back in dotted lines at 23' in FIGURE 9. Here too for example, the point of departure may be taken as being two sheets of thermo-weldable material superposed one on the other and joined together by two parallel welds 24 spaced out by the half-perimeter of the sachet and terminating on the transverse base line 25. On this line 25 are plotted the two apexes 26. A line 27 is drawn parallel to line 25 and distant from the latter by the height of the semi-trapezium of the base. Starting from points 28, straight lines 29 are drawn, forming an angle at 60° equal to the half α of the angle at the apex of the hexagon. These straight lines again cut the straight line 27 at point 30 and, geometrically, the distance between the points 20 is equal to the diagonal of the hexagon. The sachet thus produced becomes deformed, giving rise to the sachet as shown in FIGURE 9, lugs 31 fitting exactly underneath the base. In order to facilitate the formation of the box folds in this particular instance where the obtuse angle is equal to 180°, welds 32 present a minimum of width in the middle of sides 29, which correspond to the point of formation of this box fold.

If the marking out is done starting from points 30, then it will comprise a straight line 33 joining this point 31' at a point 34, such that the bisector of the angle 30', 34, 28 passes through the adjacent apex 26. In this case, the lugs of the concertina folds formed will project from the base of the prism.

Figure 11:
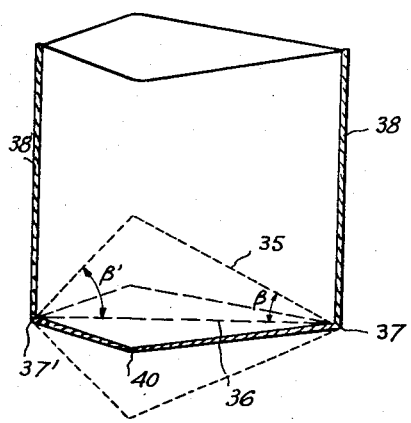
FIG. 11 is a view corresponding to that of FIGURE 7 in the case of a prismatic sachet with a base of irregular quadrangular shape.
Figure 12:
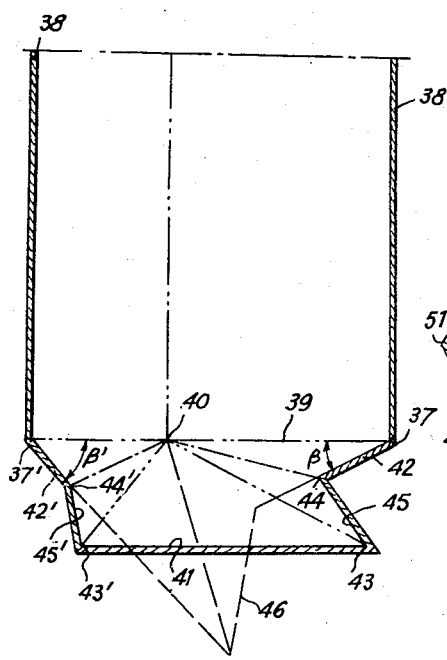
FIG. 12 is a view corresponding to that of FIGURE 8 for the production of a sachet as in FIGURE 11 with a variant form of execution shown in broken lines.

It is equally possible to make sachets having an irregular base such as the prismatic sachet of FIGURES 11 and 12 whose base 35 is a four-sided polygon symmetrical in relation to the straight line 36 joining the two opposite apexes 37. It is also possible to produce on the superposed films, two parallel welds 38 spaced out by the semi-perimeter of the base and between which base line 38 is marked out. On this base line the intermediate apex is taken back and a line 41 is traced, parallel for instance to line 39 and distant from the apex 40 by the height of a triangle forming a semi-base 35. As from the points 37—37' straight lines 42—42' are drawn, forming respectively with straight line 39 angles β and β' equal to the angles at the base of the triangles of base 35.

Two points 43, and 43' are plotted on straight line 41, the outline 40, 43, 43' reproducing a triangle of the semi-base 35, the bisector of angles 37, 40, 43 and 37' again cutting the straight lines 42, 42' at points 44, 44', and the outline is terminated by straight lines 45, 45' joining these points to points 43, 43'. This outline may be made the subject of many modifications by turning the triangle 40, 43, 43' about point 40. At the limit, one of points 43 or 43' respectively may be merged with one of points 37 or 37' respectively, forming outline 46 which in this case will give rise to one single concertina fold. With these outlines, the lugs of the box folds of the base fit exactly underneath the base but points 43 and 43' might be given a greater or a lesser space interval which would then result in the formation of box folds with the lugs retracted or projecting respectively from the base.

Figure 13:
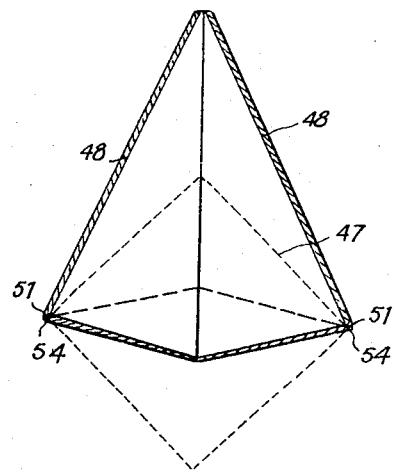
FIG. 13 is a perspective view of a pyramidal sachet with a square base.
Figure 14:
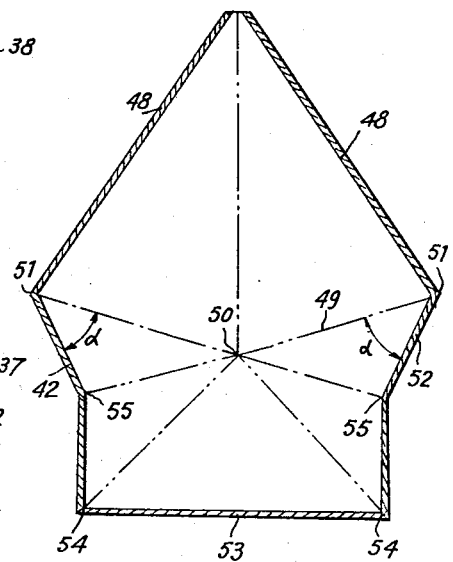
FIG. 14 is an outline view, on the flat, of a shape designed to produce the sachet shown in FIGURE 13.

In FIGURES 13 and 14, the same principle is applied as in FIGURE 7 for marking out a flat sachet which will give rise, upon being filled, to a pyramidal sachet on a square base 47. The two lateral welds 48 form between them an angle equal to twice the angle at the apex of one facing. Base line 49 is a broken line with an apex at point 50. As from points 51 two lines 52 are drawn forming with the straight lines 49 an angle α equal to 45°. The straight base line 53 is at a distance from point 50 equal to a half-diagonal of the base and, on the base, two points 54 are plotted, distant by the length of the diagonal. The diagonal from each angle 51, 50, 5', cuts straight line 52 again at point 55 and the straight line 54, 55 finishes off the outline.

FIGURES 15 and 16 correspond to a method of execution similar to that of the preceding figures and particularly to that of FIGURES 13 and 14, but with a base the shape of an irregular hexagon. Lateral welds 56 are again featured and the base line 57 is a broken line with apexes 58. Starting from apexes 59, lines 60 are drawn, forming with the base line an angle α equal to the half-angle at the corresponding apex of the base. In a similar manner, a line 61 is drawn distant from straight lines 50 by the height of the base semi-trapezium. On this base any two points are taken situated outside the point of intersection of straight lines 60 and 61. In the drawing these points have been taken unequally distant from the center, point 62 being at a distance from the line of symmetry equal to half the diagonal joining the apexes on the base which is being produced, whereas point 63 is further away from it. Point 62 is joined to a point 64 on straight line 60, point 64 being such that the straight line 65 which joins them describes with straight line 60 an angle whose bisector passes through point 58. The same procedure is followed in the case of point 63 to plot point 66 and straight line 67.

Upon being filled, the box fold corresponding to points 63, 66 project from the base of the sachet as shown at 68 in FIGURE 15.

FIGURES 17 and 18 illustrate an improvement to the type of sachets or bags described hereinabove and made of thin plastic films. Such sachets when they are filled have a volume which is defined by comparatively flat surfaces; however, by reason of the lack of rigidity of said material, said surfaces have a tendency to assume a slight bulge; in order to cut out such bulges, it is of advantage to associate with the plastic film surfaces which form the fluidtight sachets, semi-rigid reinforcements. The improvement illustrated in said FIGS. 17 and 18 has for its object to provide by simple means a permanent connection of such a reinforcement with the actual fluidtight bag or sachet.

The section of the sachet made of a plastic film includes two surfaces drawn in the manner described hereinabove with reference to FIG. 16 and two surfaces 69 constituted each by a circular sector the apical angle of which is equal to the apical angle between the edges 56. These four surfaces are piled up, the edges of the surfaces 69 registering with the edges 56 of the film sections constituting the surfaces of the sachet and welds are provided at 56, 60 and 65, so as to form the sachet and to rigidly secure also to the latter the sector-shaped film surfaces 69. This forms on each side of the sachet a sheath between the corresponding surface of the actual sachet and the plastic film 69. The reinforcement is constituted by a cut-out piece of cardboard including two sections 70, each section having a surface corresponding to the development of the lateral surfaces bounded at their lower ends by the lines 57 (FIG. 16) and laterally by a line slightly within the inner lateral edge of the welds 56. The lateral edges of these two sections 70 are provided preferably with cut-out recesses 74. These two sections 70 are connected through their lower ends extending between the points 58 of FIG. 16 by a hexagonal surface folded diametrically so as to form two trapeziums 72, the height of which is equal to one half the breadth of the bottom of the sachet. Furthermore, said bottom is provided with a semi-circular cut-out recess 73 arranged symmetrically with reference to the central fold. The sections 70 are furthermore provided with initiating folds 71 corresponding to the ridges defining the volume of the finished sachet.

The reinforcement thus constituted is inserted through introduction of the sections 70 underneath the surfaces 69 inside the sheath already referred to.

When filled, the sachet is deformed and assumes the position illustrated in FIG. 18. The two trapeziums 72 enter then a common plane forming the bottom of the sachet and it is sufficient to turn down the lug formed by the cut-out section 73, so as to lock the bottom of the sachet and thereby the whole sachet in its expanded volume condition through the reversal of the direction of fold of said lug.

In the above methods of execution the outline joining the straight line base to the lateral welds is concave, this kind of outline giving the automatic formation of the box fold. The result aimed at is perfectly achieved but in certain cases, by reason of the foil material's own elasticity and above all, by reason of the rigidity of the welds, glued seams or other ways of effecting a joint between the superposed foils constituting the flat sachet, the box folds only form and only support themselves by means of a certain pressure exerted by the sachet on the bearing surface. That is to say that the box folds are only formed, and the sachet is only stable on its base, if the sachet is sufficiently filled. Moreover, the base tends to regain its original flat shape as soon as it is raised.

These drawbacks are negligible in many cases but I have discovered that it is in fact possible to produce sachets in the flat which easily become deformed so as to give, by the creation of box folds, sachets of a flat base, the box folds being blocked in position.

This result is achieved by producing the junction line between the lateral edges of the sachet and the base weld of the flat sachet by two straight lines forming between them a convex angle.

With such sachets it is necessary to take in the points after filling, so as to obtain the formation of the box fold but the box folds thus produced confer a greater stability on the sachet, the flat base no longer losing its shape even when the sachet is almost empty.

To produce a sachet with a base of definite shape, the tracing out is done according to the method described above, the points chosen on the said straight line base axis being taken inside the intersections of the said straight line base axis with straight lines forming with the base line an angle equal to the half-angle at the corresponding apex of the base polygon.

An example of such a layout is illustrated in FIGURES 19 to 21 in respect of a flat sachet (FIG. 20) which loses its shape upon being filled, to give rise to a prismatic sachet on a regular hexagonal base, which base is represented in FIGURE 21.

This sachet is made starting from two foils of thermo-weldable material which are superposed and joined by two parallel welds 81 and spaced apart by half the perimeter of the sachet, and terminating on the transverse base line 82. On this line 82, two points 83 are plotted which correspond to the apex of the base of the prism, these two points dividing the base line into three equal parts, then a line 84 is drawn parallel to line 83 and at a distance from the latter of the height of the trapezium forming a half-base. Starting from points 85 corresponding to the apex of the base, there are drawn to the lower end of welds 81, straight lines 86 forming an angle λ equal to 60°, that is to say, equal to the angle at the base of the isosceles trapezium forming a semi-base. These straight lines 86 again cut straight line 84 at a point 87. Points 88 are selected situated on the line 84 inside points 87. The drawing of the sachet is terminated by joining these points 88 to points 89 on lines 86, the points 89 being fixed geometrically in such a way that the bisector of angle μ formed by straight lines 86, 88, 89 passes through point 83.

When the sachet is filled, the said sachet swells up under the pressure of the liquid and it is sufficient, by exerting at points 89, pressures directed towards the inside of the sachet, to bring back in again the points formed at that place by the filled sachet so that a flattened base tends to be formed. When the pressures at points 89 are suppressed, the deformation still goes on, and if the sachet is placed on a flat surface, the base flattens out permanently as shown in FIGURE 21, a box folding being formed inside outline 85, 83, 88, the folding of the box fold in question taking place along lines 83—89.

The method of execution described above can be applied to the other shapes of sachet previously described.

FIG. 22 illustrates a method for producing on two superposed foils of thermoplastic material, flat sachets which automatically lose their shape upon being filled, to produce, by the formation of a box fold, a pyramidal sachet with a flat base similar to those described with reference to FIGURES 15 to 18.

As will be evident from the description which now follows, this sachet has, in comparison with the preceding type, certain technical advantages, and also permits of the manufacture of such sachets without loss of material.

In FIGURE 22 are represented the production of only two sachets on superposed strips whose width is equal to the height of the flat sachet, but it is quite obvious that it is possible to produce, over the whole length of the strip, the outline of multiple sachets.

The particularity of the sachets of FIG. 22 is that they are produced head-to-tail in relation to the adjacent sachet, being formed by parallel welds such as 90, between which it is sufficient to make a cut-out 91 in such a manner as to separate the sachets. In the portion of the outline adjacent to the base of one of the sachets and located at right-angles to point 92 where the box fold is formed, the weld of the neighbouring sachet is enlarged as represented at 93. This surface enables the sachet to be gripped more easily, with the aid of a pair of pliers, for example, in order to place it on the filling machines. It is also possible to make in this surface, perforations such as 94 enabling the sachet to be suspended on two pins placed on either side of the filler neck, or to provide the filled sachet with a piece of string forming a handle and so enabling it to be carried.

Moreover, there are superposed on the two strips forming the sachets, and on each side of the latter, two center strips 95 made of a thermo-weldable substance compatible with these two main strips, the strips 95 in question being attached by welds 90 and cut-out along outline 91. These strips form a partial sheathing for the sachet walls and ensure that semi-rigid strengthening pieces—which will be described in the following notes—are maintained in position.

The strengthening pieces are constituted by two cut-out pieces of carton represented in FIGURE 23. These two strengthening elements have a principal surface of fairly trapezoidal shape 96 fitting between the welds 90 of strips 95 and extending beyond the latter upwards, this surface being provided with a cut-out 97 giving rise to a tab and a circular shaped perforation 98. This surface 96's lower portion is limited by two straight lines corresponding to the outline of two of the sachet's base edges starting from welds 90, the centre portion being extended by the rectangular tab 99 which, in one instance, has two fairly parallel cut-outs 100 and, in the other instance, two tabs 101 shown in dotted lines and capable of engaging in the said cut-outs 100.

The carton shape thus produced is provided with folding scarves 102 shown in broken lines, these folding scarves 102 joining the centre hole to the edge of the blank as shown, in such a way as to pre-shape the facings of the assembled and filled sachet.

The strengtheners above described are slipped between the sachet and strips 95, the tabs 97 being passed over the upper edge of the strip 95 in such a way as to hold the strengtheners in place. Then, the sachet is filled, the base of the said sachet changing its shape and tending to give a flat base of hexagonal shape; then the two tabs 99 are bent back under this base and they are fastened with the aid of the tabs 101 fitted in the cut-outs 100, the sachet assuming the shape shown in FIGURE 24.

The folding scarves 102 produce on this sachet, side edges which give it a pyramidal shape on a diamond-shaped base with two triangular facets 103 terminating on the centre perforation 98. All that now remains is to close off the sachet's opening by a weld 104.

The sachet has a good rigidity by virtue of the base formed by the tabs 99 and its own geometrical shape; the perforations 98 provide a grip surface for the fingers holding the sachet.

When it is desired to make use of the sachet's contents, all that is necessary is to cut the apex of the angle formed between welds 93 and 104. It is possible to obtain two pouring spouts of different sections by cutting one of the angles near its apex and the other at a greater distance thereof.

The sachet of FIGURES 25 and 26 is of the type with an outline having at the base, box angles 105 and, at the apex, other box angles 106 between the side weld and the portion forming the neck, so as to produce the box folds which form automatically to give a hexagonal base and an upper surface whose general shape is also hexagonal.

The lower portion of the sachet is sheathed on its two facings by a film 107 gripped at its edges in the welds used in the formation of the sachet. Thus, there are produced, on the two facings, two pockets in which it is possible to fit strengtheners such as cartons 108 having folding scarves 109 following the outline of the side edges of the volumetric shape which the sachet under consideration is intended to assume when it is filled. These strengtheners may have openings such as 110 which, if the thermoplastic films happen to be transparent, make it possible to see the liquid contained in the sachet. In order to ensure that the said strengtheners are held in place, they can include portions of extra width such as 111 which are caught up in narrowing sections in the space between the films 107 and the sachet proper, these narrowing sections being produced for example, by weld-line 112.

The neck of the sachet as per FIGURE 25 has a special shape as illustrated in the drawing. A transverse strip 113 fitted between the two lateral welds of the base of the neck makes it possible to re-close the filled sachet in a sufficiently fluid-tight manner, by folding back the neck 114 a matter of 180° and fitting this folded-back portion under strip 113.

Figure 27:
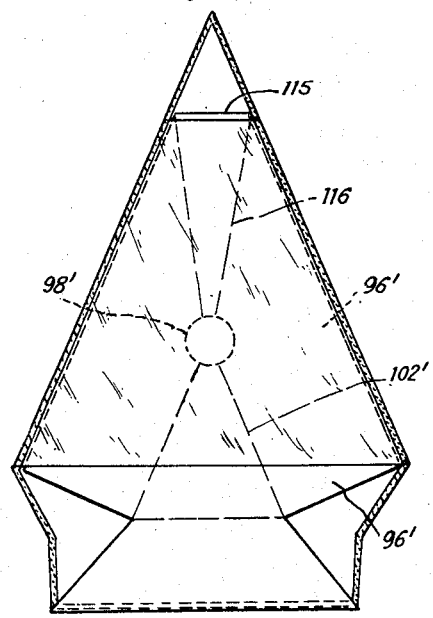
FIG. 27 is a view on the flat of a pyramidal sachet with carton strengthening piece ensuring that the apex is gripped tight.
Figure 28:
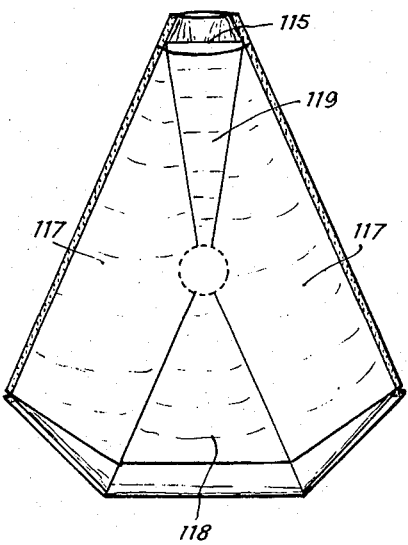
FIG. 28 is a view of the same sachet in a filled condition, the top being cut off.

The sachet of FIGURES 27 and 28 is similar to that of FIGURES 22 and 24. It differs from it essentially by virtue of the fact that the thin carton strengthener 96' has, as from hole 98' and in the direction of its upper rectilinear edge, two folding scarves 116 terminating in the upper corners of the strengthener. The lower folding scarves running from hole 98' towards the base have been retained. When the sachet, totally or partially filled is placed on its base as shown in FIGURE 28, the facings produced by the folding scarves tend to assume a convex shape so as to give rise to the pyramidal shaping of the flat foil with hole 98' as the apex, but facings 117 and 118, subjected to a higher hydrostatic pressure and which have a larger, surface area, undergo the maximum deformation, facing 119 staying practically flat. The free edges 115 grip between them the apex of the plastic sachet, practically forming a pincer-like grip giving a degree of fluid-tightness in the open sachet sufficient to prevent evaporation.

Figure 29:
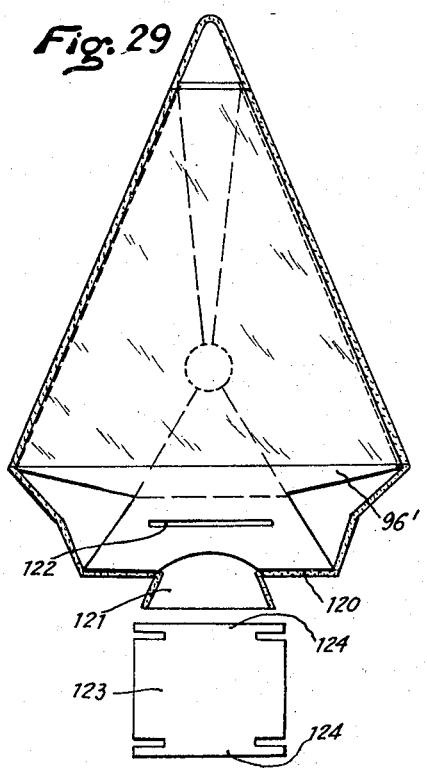
FIG. 29 is a view on the flat of a bottom-filled sachet and its stopper cap.
Figure 30:
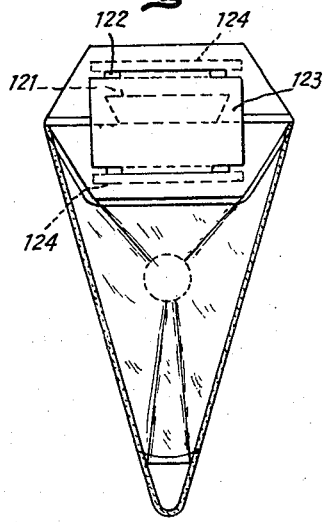
FIG. 30 is a perspective view from underneath the filled sachet.

The sachet of FIGURES 29 and 30 is similar to that described above but, in the course of its being manufactured, the weld produces, along base axis weld 120, a filling neck 121. The portion of the strengthener cartons 96' corresponding to the base, has a slit 122. The strengthener proper is completed by a cap 123 made preferably of waterproofed carton or similar material, having two opposing T shaped tongues 124.

The sachet is filled in an upside-down position after which the neck 121 is closed by a weld made as closely as possible to the base axis weld. The sachet is then put into shape, the neck being bent back underneath the strengthener's bottom tabs 96'. The cap 123 is then placed in position, tongues 124 being fitted in slits 122 so as to lock the base in position, as can be seen in FIGURE 30. The said cap 123 also protects the base when the latter is placed on a damp surface.

The sachet shown in FIGURES 31 and 32 illustrates a sachet in which the flat facings created by the method as per the invention no longer constitute the base but the terminal facings of a prismatic sachet. The concertina-like folds are then located in the vertical facings of the volumetrically deformed sachet.

The upper horizontal outline and the lower horizontal outline are, consequently, of a length corresponding to the edge of the prismatic volumetric shape and are distant from each other by the semi-perimeter of the section and they are joined by two lateral lines corresponding to the formation of a flat facing by box folds, these traced lines being produced as described above, depending on the section which is to be obtained.

The flatwise sachet is constituted in the example in question, by two superposed films of thermoplastic material welded together, and the aim is to produce a sachet which will assume the shape of a cube having a pouring neck on one of its side edges.

The flatwise sachet has a lower weld 131 the length of which is equal to the side edge of the cube, and an upper weld 132 of the same length but making provision for the filler neck 133, the distance between the two welds being equal to twice the length of the side edge.

These two welds are joined by lateral welds the outlines of which are permanently defined, in accordance with the invention. The two portions of perpendicular welds 134 are at a distance from straight line 135—135 equal to the half-median of the facing. The welds 136 form, with straight lines 135—135, an angle $p$ equal to 45° and the welds 137 are marked out in such a way that the bisector of the angle of welds 136—137 passes through points 138.

Upon being filled, the sachet distends, to give rise to a cube shape. As a matter of preference the box folds will be cleated in position by a gummed strip 139 encircling the wrapper, neck 133 being closed by a weld 140.

The methods of execution as described in the foregoing by way of example are capable of being made the subject of many modifications without departing from the scope of the invention.

What I claim is:

1. A container comprising at least two flat panels of deformable material each having lateral edges and a transverse bottom edge, the length of said bottom edge being less than the width of said panels between the lower ends of said lateral edges, and margins of said panels extending from said lower ends of said lateral edges to the ends of said bottom edge, the said panels being sealed together at said edges and margins, and said margins being recessed to form an obtuse angle.

2. A container, as set forth in claim 1, in which the panels have a transverse top edge and margins joined together in a manner corresponding to that of the bottom edge and margins, and said container having an open neck extending from the top thereof.

3. A container, as set forth in claim 1, in which the recess provided is exteriorly of the container.

4. A container, as set forth in claim 1, in which the recess provided is interiorly of the container.

5. A container comprising at least two flat panels of deformable material each having lateral edges and a transverse bottom edge, the length of said bottom edge being less than the width of said panels between the lower ends of said lateral edges, and margins of said panels extending from said lower ends of said lateral edges to the ends of said bottom edge, the said panels being sealed together at said edges and margins, and at least one of said margins being recessed to form an obtuse angle.

6. A container comprising two flat panels of deformable material having lateral and bottom edges that are sealed together, a portion of said bottom edge, extending from the lower end of a lateral edge, being recessed and sealed to form an obtuse angle.

7. A container, as set forth in claim 6, in which reenforcing sheaths are provided for the panels except for a portion of the panels adjacent a recess.

8. A container comprising at least two flat panels of deformable material each having lateral edges and a transverse bottom edge, the length of said bottom edge being less than the width of said panels between the lower ends of said lateral edges, and margins of said panels extending from said lower ends of said lateral edges to the ends of said bottom edge, the said panels being sealed together at said edges and margins, the width of the seals in the marginal seals being reduced intermediate the ends of said seals, thereby providing recesses in said margins, each forming an obtuse angle.

9. A container for liquids, said container having a side wall, and a closed bottom end comprising at least two sheets of deformable material having edges tightly joined together, a portion of the bottom edge, extending from the lower end of said side wall, being recessed to form an obtuse angle.

References Cited in the file of this patent

UNITED STATES PATENTS

| | | |
|---|---|---|
| 2,323,287 | Amberg | July 6, 1943 |
| 2,412,544 | Waters | Dec. 10, 1946 |
| 2,446,308 | Smith | Aug. 3, 1948 |
| 2,673,495 | Hecker | Mar. 30, 1954 |
| 2,787,408 | Andre | Apr. 2, 1957 |